UNITED STATES PATENT OFFICE.

EDMUND J. MILLS, OF GLASGOW, SCOTLAND.

PROCESS OF PREPARING SOLUBLE COLLOIDS.

SPECIFICATION forming part of Letters Patent No. 569,112, dated October 6, 1896.

Application filed April 11, 1896. Serial No. 587,202. (No specimens.)

*To all whom it may concern:*

Be it known that I, EDMUND JAMES MILLS, D. Sc., F. R. S., a subject of the Queen of Great Britain and Ireland, and a resident of Glasgow, Scotland, have invented certain Improvements in the Formation and Preparation of Soluble Colloids, such as Gelatin and Isinglass, of which the following is a specification.

This invention has for its object to render soluble in cold water, so as to be advantageously or conveniently applicable for various useful purposes, certain colloids, such as gelatin and isinglass, which are ordinarily insoluble in cold water.

In carrying out the invention I take gelatin or a gelatin-containing or gelatigenous substance and add to to it an alkali (either caustic or carbonated, but preferably caustic) or a caustic alkaline earth and heat the mixture with water. In a short time a gelatin compound is formed which remains permanently liquid in the cold. The proportion of alkaline material to be used depends partly on the nature of the gelatin under treatment; but a fair sample of gelatin can in general be permanently liquefied by heating to 100° centigrade, with an equal weight or more of water and one-twentieth of its weight of slaked lime, for about two hours. The desired effect can be obtained either in open or in closed or partly-closed vessels, it being convenient to employ the latter when ammonia or a carbonate is used.

It is found that by the described treatment more or less of the phosphate naturally present in ordinary gelatin is separated. When lime is used, for example, the phosphate is wholly precipitated, and the solution, if reasonable care be taken, will "keep" indefinitely.

Gelatin permanently liquefied by the described treatment is very suitable for many technical purposes, such as joiner work, bookbinding, and the mounting of prints on cardboard. It is also very useful in lithographic work, as a gum or thickener in calico-printing, in the treatment of wool, in dyeing various materials, as an emulsifier, and as a detergent. It has, moreover, the advantage of being without action on many metallic surfaces.

What I claim as my invention is—

The process of preparing from gelatin or a gelatin-containing or gelatigenous substance a solution permanently liquid in the cold, by treating it with an alkaline substance with the aid of heat substantially as hereinbefore described.

In testimony whereof I have signed my name to this specification in the presence of two subscribing witnesses.

EDMUND J. MILLS.

Witnesses:
WILLIAM THORNTON,
DAVID FERGUSON.